United States Patent
Masuda et al.

(10) Patent No.: US 11,157,006 B2
(45) Date of Patent: Oct. 26, 2021

(54) TRAINING AND TESTING AUTOMATED DRIVING MODELS

(71) Applicant: INTERNATIONAL BUSINESS MACHINES CORPORATION, Armonk, NY (US)

(72) Inventors: Satoshi Masuda, Nerima-ku (JP); Hiroaki Nakamura, Yokohama (JP); Koichi Kajitani, Kawasaki (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 470 days.

(21) Appl. No.: 16/244,519

(22) Filed: Jan. 10, 2019

(65) Prior Publication Data
US 2020/0225668 A1 Jul. 16, 2020

(51) Int. Cl.
*G05D 1/02* (2020.01)
*G05D 1/00* (2006.01)

(52) U.S. Cl.
CPC ......... *G05D 1/0214* (2013.01); *G05D 1/0088* (2013.01); *G05D 2201/0213* (2013.01)

(58) Field of Classification Search
CPC .............. G05D 1/0297; G05D 1/0285; G05D 2201/0202; G05D 1/0251; G05D 1/0257; G05D 1/0223; G05D 1/0214; G05D 1/0278; G05D 1/0276; G05D 1/0808; G05D 1/101; G05D 2201/0213; G07C 5/08; H04L 67/12; H04W 4/38; H04W 4/40; H04W 4/02; H04W 4/46; H04W 84/18; H04W 4/026; B60W 10/10; B60W 30/00; B60W 30/09; B60W 30/12; B60W 30/18163;
(Continued)

(56) References Cited

U.S. PATENT DOCUMENTS

| 7,127,381 B2 * | 10/2006 | Forest ..................... G06T 17/00 703/2 |
| 2014/0122043 A1 * | 5/2014 | Bellamy ................. G06F 3/048 703/6 |
| 2017/0371986 A1 | 12/2017 | Yang et al. |

(Continued)

OTHER PUBLICATIONS

Mullins, "Delivering Test and Evaluation Tools for Autonomous Unmanned Vehicles to the Fleet", John Hopkins APL Technical Digest, vol. 33, No. 4, Apr. 2017, pp. 279-288.
(Continued)

*Primary Examiner* — James J Lee
*Assistant Examiner* — Shon G Foley
(74) *Attorney, Agent, or Firm* — Tutunjian & Bitetto, P.C.; Randall Bluestone

(57) ABSTRACT

Methods and systems for deploying an automated driving model include testing an automated driving model with a set of scenarios that include a single obstacle. The set of scenarios is pruned to include only those scenarios that do not result in a collision, but that may result in a collision with the addition of another obstacle. New scenarios are added to the set of scenarios to include scenarios that have an additional obstacle to form an updated set of scenarios. The automated driving model is tested with the updated set of scenarios. The automated driving model is deployed to a vehicle to control operation of one or more systems in the vehicle.

20 Claims, 7 Drawing Sheets

(58) Field of Classification Search
CPC ............ B60W 30/14; B60W 2554/408; B60R 16/0232; B60R 16/023
See application file for complete search history.

(56) References Cited

U.S. PATENT DOCUMENTS

2020/0081445 A1* 3/2020 Stetson .............. G06K 9/6218
2020/0082034 A1* 3/2020 Sholingar ............ G06N 20/10

OTHER PUBLICATIONS

Abdessalem, "Testing Advanced Driver Assistance Systems Using Multi-Objective Search and Neural Networks", 31st IEEE/ACM International Conference on Automated Software Engineering, Sep. 2016, pp. 63-74.

* cited by examiner

TRAINING AND TESTING AUTOMATED DRIVING MODELS

BACKGROUND

Technical Field

The present invention generally relates to automated driving technologies and, more particularly, to efficient testing and deployment of automated driving models.

Description of the Related Art

Automated driving technologies are used to make navigational decisions in real-time for automobiles that are equipped with automated control systems. Automated control systems can control steering, acceleration, and braking systems within an automobile and use sensor data to detect and avoid obstacles and other automobiles on the road while moving toward a destination. The automated control systems use one or more automated driving model to process the sensor information and to determine one or more actions to achieve those goals.

SUMMARY

A method for deploying an automated driving model includes testing an automated driving model with a set of scenarios that include a single obstacle. The set of scenarios is pruned to include only those scenarios that do not result in a collision, but that may result in a collision with the addition of another obstacle. New scenarios are added to the set of scenarios to include scenarios that have an additional obstacle to form an updated set of scenarios. The automated driving model is tested with the updated set of scenarios. The automated driving model is deployed to a vehicle to control operation of one or more systems in the vehicle.

A system for deploying an automated driving model includes a testing module configured to test an automated driving model with a set of scenarios that include a single obstacle. A pruning module is configured to prune the set of scenarios to include only those scenarios that do not result in a collision, but that may result in a collision with the addition of another obstacle, and to add new scenarios to the set of scenarios to include scenarios that have an additional obstacle to form an updated set of scenarios. The testing module is further configured to test the automated driving model with the updated set of scenarios. A network adapter is configured to deploy the automated driving model to a vehicle to control operation of one or more systems in the vehicle.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention train and test automated driving models that are used in automated driving automobiles to make decisions regarding navigation on the road to avoid obstacles and other vehicles. Because of the serious consequences of a system failure in an automated driving system, automated driving models are rigorously tested before deployment to ensure that they provide a safe and comfortable ride to any passengers.

However, as the number of cars on the road increases, the number of possible scenarios to be tested increases dramatically. In particular, whereas the number of scenarios that feature three other cars is relatively tractable, the number of scenarios that include four other cars increases dramatically, with five cars representing a tremendous number of scenarios to be tested. This imposes a substantial burden when testing a new or updated automated driving model and imposes a practical limit on the number of cars that can be considered in realistic scenarios.

The present embodiments address this problem by pruning the number of scenarios to consider. A first set of simulations is run on various scenarios that feature only a single other vehicle on the road. Those scenarios that result in a collision or that can never result in a collision are noted, but are not used in subsequent iterations of the simulation. The remaining scenarios are those in which the single vehicle could cause a collision if there is at least one additional vehicle on the road.

The second set of simulations begins with only those scenarios from the first set that could result in a collision with the addition of one or more additional vehicle. Thus, the second set of simulations considers scenarios that feature two other vehicles on the road. Those scenarios from the second set that result in a collision or that can never result in a collision are again noted and discarded in the third set of scenarios, which is based on only those scenarios in the second set which could result in a collision with the addition of one or more vehicles.

In this manner, the number of vehicles is iteratively increased, with the scenarios that are considered being pruned from one iteration to the next. As a result, the number of scenarios that are considered with larger number of vehicles on the road is significantly reduced, making the testing of automated driving models far more tractable, such that more such models can be evaluated and training of the models can be accelerated. As a practical result, the automated driving models can be refined much more quickly, making the deployed automated driving systems safer. In some scenarios, where the automated driving system within a vehicle is able to independently train and update its automated driving model based on its own driving conditions and sensor data, the reduction in testing burden makes it feasible for such an automated driving model to perform on-board model testing during a training process.

Figure 1:
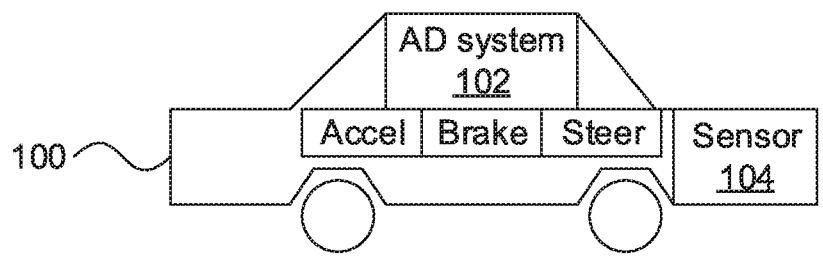
FIG. 1 is a diagram of an automated driving vehicle that includes an automated driving model that is trained, tested, and deployed in accordance with an embodiment of the present invention.

Referring now to FIG. 1, a vehicle 100 with an automated driving system 102 is shown. The automated driving system 102 interfaces with various systems in the vehicle 100, including acceleration/throttle systems, braking systems, and steering systems. The automated driving system 102 can furthermore interface with other vehicle systems, for example engaging or disengaging systems such as traction control, four-wheel drive, global positioning satellite receiving, and any other systems relating to navigation and control for the vehicle 100. The automated driving system 102 can be fully autonomous, accepting no driver input, or can be partially autonomous, where only some vehicle systems are controlled or where control can be overridden by a driver.

The systems of the vehicle 100 are limited in terms of their ability to change the vehicle's state. For example, the acceleration and braking systems are limited in the acceleration they can exert on the vehicle 100, and the steering systems are limited in their turning radius and response speed. These different factors dictate how the vehicle 100 can move on the road within a given time period.

It should be understood that the term "vehicle" is used herein to refer to many different kinds of vehicles, including passenger vehicles and cargo vehicles. It should further be understood that the term "vehicle" is not limited to automobiles and other motorized conveyances, but can also include human-powered vehicles, such as bicycles.

As the vehicle 100 navigates on a roadway, it will encounter a variety of obstacles. Some of these obstacles are fixed in place, such as traffic control devices, while others may be in motion, such as road debris and other vehicles. The vehicle 100 includes one or more sensors 104 that sense the presence of obstacles on the road. The sensors 104 have a certain range, within which they are able to reliably detect the presence of an obstacle.

The present embodiments test automated driving models by considering the capabilities of the vehicle 100 and testing different scenarios that challenge the automated driving system 104 to avoid obstacles to reach a goal with a certain amount of time. Toward that end, the test scenarios are treated as if they were different positions in a game simulation, with the other vehicles being treated as players having the goal of causing a collision.

Figure 2:
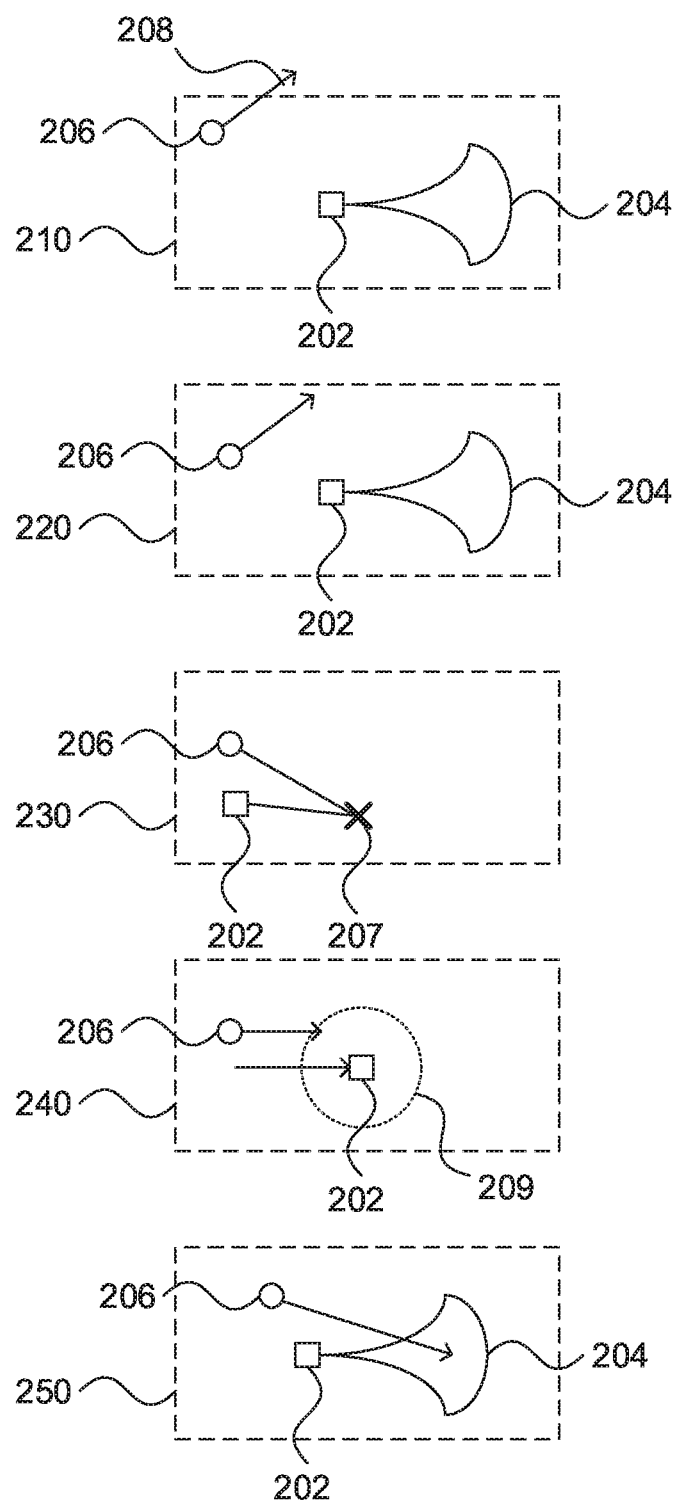
FIG. 2 is a set of diagrams illustrating different scenario outcomes for an automated driving vehicle that includes an automated driving model that is trained, tested, and deployed in accordance with an embodiment of the present invention.

Referring now to FIG. 2, a variety of different scenarios are shown featuring the vehicle 202 and one obstacle 206. In a first scenario 210, the obstacle 206 has a trajectory that takes it outside of the scenario boundaries. The obstacle's trajectory is treated as fixed within the scenario, representing one set of input parameters to the scenario. Testing therefore extrapolates the obstacle's position as time progresses in the scenario. Other input parameters include the road layout and any applicable model rules. The automated driving vehicle 202 has a range of possible paths 204 that are determined by the properties of the acceleration, braking, and steering systems, representing locations that the vehicle 202 can move to during the duration of the scenario. During this scenario, there is no possibility that the trajectory 208 of the obstacle 206 can intersect with the vehicle 202 to cause a collision.

In a second scenario 220, the trajectory 208 of the obstacle 206 stays within the scenario boundaries, but does not approach the vehicle 202 or its potential paths 204. The second scenario 220 therefore also has no ability to cause a collision. In a third scenario 230, the trajectory of the obstacle 206 intersects with all possible paths of the vehicle 202, guaranteeing a collision 207. In a fourth scenario 240, the trajectory of the obstacle 206 puts it within a sensing distance 209 of the vehicle 202. In a fifth scenario 250, the trajectory of the obstacle 206 puts it within the possible paths 204 of the vehicle 202.

It should be understood that multiple outcomes can co-occur. For example, scenarios 240 and 250 can occur if the obstacle 206 moves in front of the vehicle 202, within the sensing distance 209. Similarly, scenarios 240 and 230 can co-occur if the obstacle collides the vehicle 202 from behind, such that the obstacle 206 enters the sensing distance 209 and causes a collision 207, but never enters the vehicle's path 204. Table 1 below shows the possible combinations:

TABLE 1

| Reach goal | Collision | Sensing | In path | Result |
| --- | --- | --- | --- | --- |
| 0 | 0 | 0 | 0 | Safe |
| 0 | 0 | 0 | 1 | Next |
| 0 | 0 | 1 | 0 | Safe |
| 0 | 0 | 1 | 1 | Next |
| 0 | 1 | 0 | 0 | Impossible |
| 0 | 1 | 0 | 1 | Impossible |
| 0 | 1 | 1 | 0 | Impossible |
| 0 | 1 | 1 | 1 | Collision |
| 1 | 0 | 0 | 0 | Safe |
| 1 | 0 | 0 | 1 | Next |
| 1 | 0 | 1 | 0 | Safe |
| 1 | 0 | 1 | 1 | Next |
| 1 | 1 | 0 | 0 | Impossible |
| 1 | 1 | 0 | 1 | Impossible |
| 1 | 1 | 1 | 0 | Impossible |
| 1 | 1 | 1 | 1 | Impossible |

The first column of Table 1 indicates whether the vehicle 202 reaches its goal in the scenario, the second column indicates whether a collision occurs, the third scenario indicates whether the obstacle enters the sensing distance 209 of the vehicle 202, the fourth column indicates whether the obstacle 206 moves within the path 204 of the vehicle 202, and the fifth column indicates what the outcome is. Outcomes marked as "safe" indicate scenarios where the obstacle 206 cannot cause a collision with the vehicle 202, outcomes marked as "collision" indicate scenarios where a collision occurs, and outcomes marked as "next" indicate scenarios where a collision could be possible with the addition of another vehicle to the scenario.

Outcomes marked as "impossible" indicate results that will never occur. For example, if a collision 207 occurs, then the vehicle 202 will not reach its goal. As another example, an obstacle 206 needs to enter the sensing distance 209 to cause a collision 207. Thus, scenarios which include a collision, without sensing, cannot occur. It should be noted that the "path" for the vehicle 202 need not be entirely in front of the vehicle 202. While this may seem counter-intuitive, the vehicle 202 will be moving in space during the scenario, such that an obstacle can approach from behind and enter the vehicle's path.

When a next obstacle 206 is added to the scenarios, only those with a "next" outcome are considered. The testing of the second set of scenarios then proceeds with this pruned set, cutting down on the number of scenarios that need to be tested. The process is repeated for third and fourth obstacles and potentially more obstacles as well. These same basic scenarios are also present with the additional obstacles being present.

Figure 3:
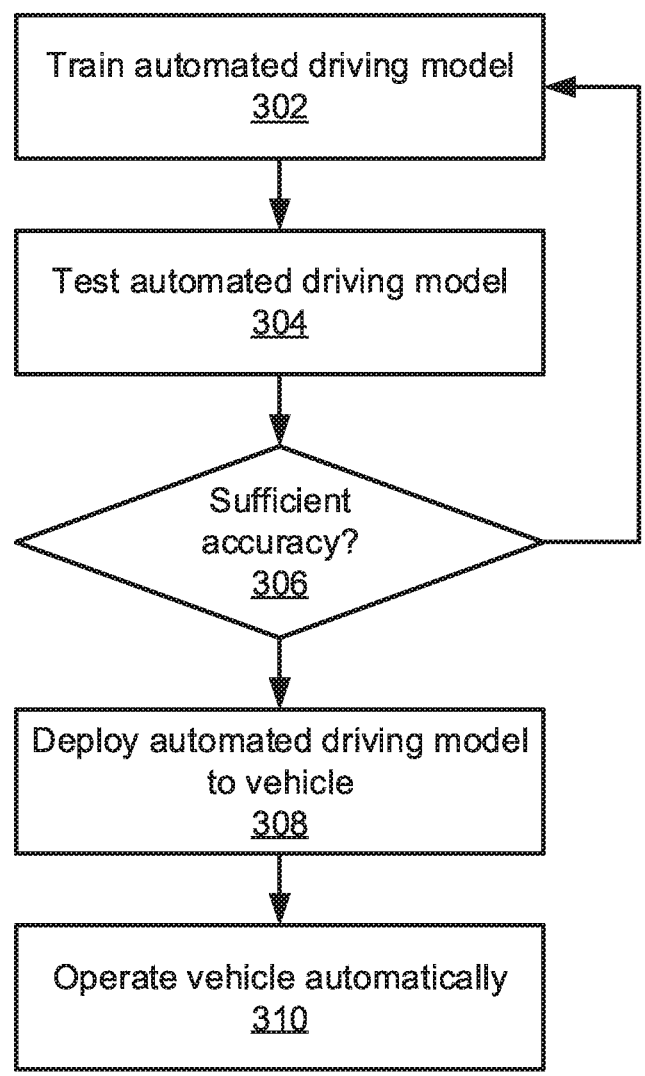
FIG. 3 is a block/flow diagram of a method for training, testing, and deploying an automated driving model to an automated driving vehicle in accordance with an embodiment of the present invention.

Referring now to FIG. 3, a method of training and deploying an automated driving model is shown. Block 302 trains an automated driving model. The training process can include any appropriate process that includes, for example, machine learning systems such as neural networks. The training process includes a set of training data that may include scenarios as described above and may tune a set of parameters of the automated driving model to produce a model that safely operates the vehicle 100. Once an automated driving model is trained, block 304 tests the automated driving model according to sets of scenarios that feature one or more obstacles 206 on the road with the vehicle 202. Testing includes using the trained automated driving model, with simulated sensor information, to guide a simulated vehicle through a scenario toward a scenario goal. As described above, the testing process of block 304 prunes the scenarios between iterations, further testing only those scenarios that have the possibility of resulting in a collision with the addition of another vehicle.

Block 306 determines whether the results of the testing indicate that the automated driving model has a sufficient accuracy to be deployed. This is a measure of how many scenarios result in a collision. As the training of the automated driving model improves, the number of collision scenarios should decrease. If the accuracy is too low, processing returns to block 302 to further train and refine the automated driving model until block 306 finds sufficient accuracy.

Block 308 then deploys the automated driving model to the automated control system 102 of the vehicle 100. This deployment can occur at the factory or can be transmitted to the car after its initial sale, for example in an over-the-air wireless transfer or when the vehicle is being serviced. In an alternative embodiment, the automated driving model can be updated in real-time in the car itself based on information derived from sensors and other variables, such as environmental conditions, driving patterns, and any other appropriate data that can be used to improve automated driving performance. Block 310 then uses the automated driving model to operate the automated control system 102, operating the various systems of the vehicle 100 to respond to information from the sensors 104.

Figure 4:
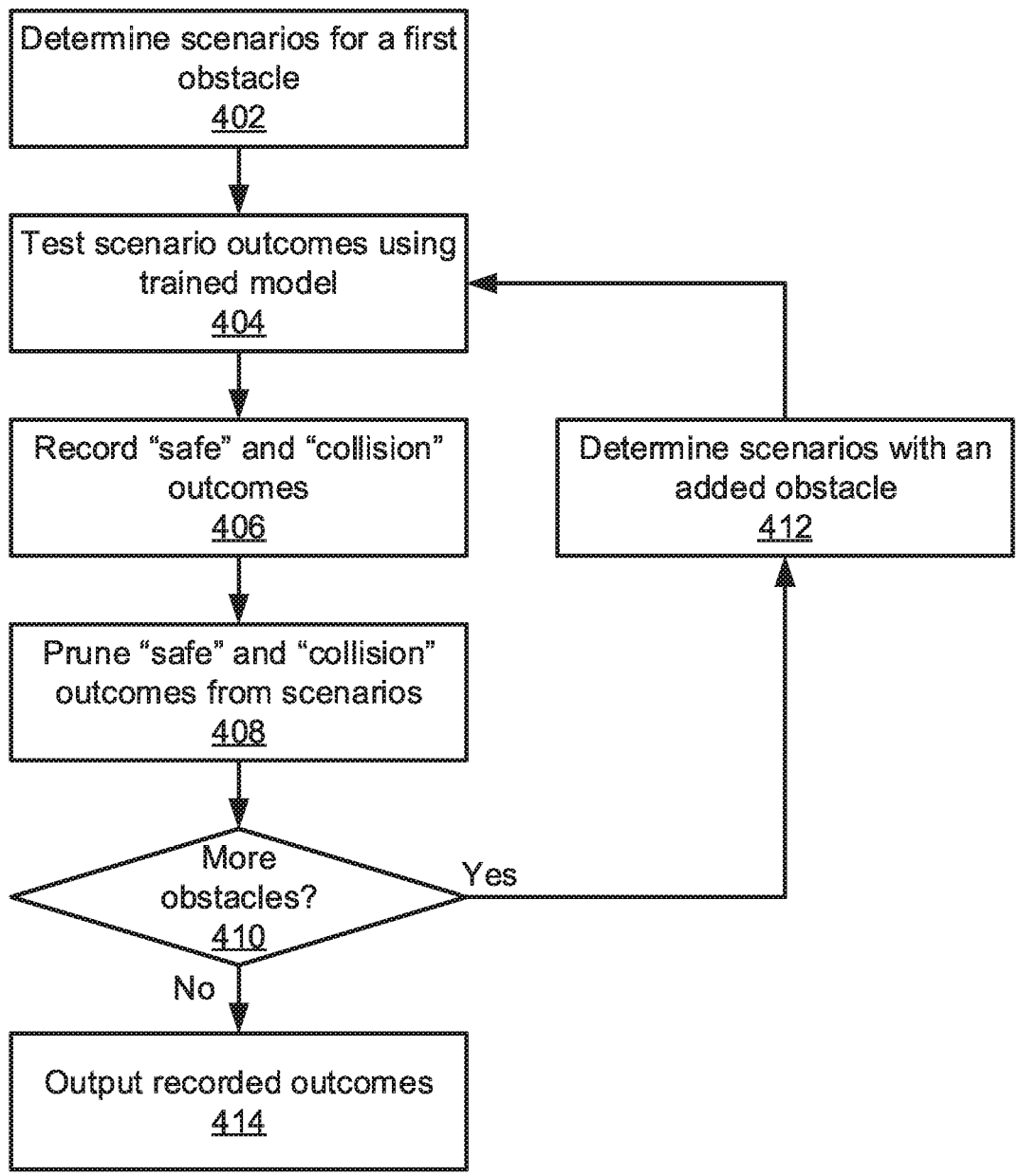
FIG. 4 is a block/flow diagram of efficiently testing an automated driving model by pruning scenarios that have certain outcomes before adding additional obstacles to the scenarios in accordance with an embodiment of the present invention.

Referring now to FIG. 4, additional detail on the testing of block 304 is shown. Block 402 determines a first set of scenarios for a single obstacle 206 on a road segment with a vehicle 202. A large number of different scenarios are included in the first set to reflect the different starting conditions of relative starting positions and the parameters of the obstacle 206 and the vehicle 202. Each scenario covers a discrete amount of time, with moves of the vehicle 202 and the obstacle 206 being assessed at time steps within the scenario (e.g., steps of 0.1 seconds).

Block 404 tests the set of scenarios. Testing involves using the trained automated driving model to navigate the vehicle 202 toward the goal while avoiding any obstacles 206 that it senses. Block 406 records the outcomes of the tested scenarios, in particular those that reach "safe" or "collision" results. Block 408 then prunes the "safe" and "collision" scenarios from the set of scenarios.

Block 410 determines whether another iteration should be run with an additional obstacle. This process can be repeated for any number of obstacles, though it should be understood that, even with the pruning of the present embodiments, the number of scenarios to be considered will still increase quickly with the addition of new obstacles. It is specifically contemplated up to five obstacles can be tested, but alternative embodiments consider six or more obstacles. It should be understood that there are diminishing returns to adding more vehicles, not only because the increased amount of time needed to test the scenarios, but also because the addition of another vehicle to an already crowded roadway does not greatly increase the likelihood of a collision.

If another obstacle is needed, block 412 creates a new set of scenarios, based on the remaining scenarios from the previous iteration, that include an additional obstacle. The testing process is then repeated with the new set of scenarios. This process continues until a maximum number of obstacles has been reached. At this point, block 414 outputs all of the recorded outcomes as the testing results for the automated driving model.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The present embodiments provide substantial reductions in the amount of time needed to test a given number of scenarios. Table 2 below shows a comparison between the time burden for testing an unpruned set of scenarios with up to four cars and testing a set of scenarios that is pruned according to the present embodiments, for highway scenarios and for scenarios that occur in an intersection. The baseline calculation tests all scenarios, with all different numbers of obstacles, in a single pass and so these results do not include the amount of time the baseline test would take for these intermediate results. The present embodiments nearly halve the amount of time needed to test a given number of test cases as compared to performing the test without pruning.

TABLE 2

| Number of obstacles | Time for highway scenarios (mins) | | Time for intersection scenarios (mins) | |
|---|---|---|---|---|
| | Baseline | Pruned | Baseline | Pruned |
| 1 | n/a | 0.1 | n/a | 0.3 |
| 2 | n/a | 0.8 | n/a | 1.0 |
| 3 | n/a | 20.0 | n/a | 20.6 |
| 4 | n/a | 84.0 | n/a | 96.8 |
| Total | 200 | 104.9 | 220 | 118.7 |

Figure 5:
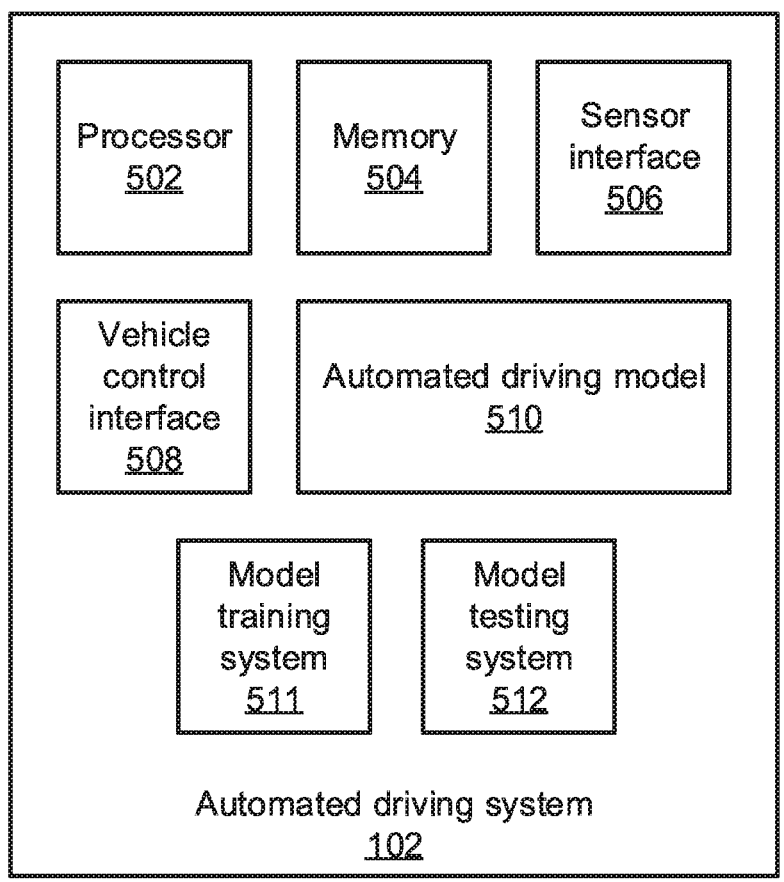
FIG. 5 is a block diagram of an automated driving system that trains and tests an automated driving model in accordance with an embodiment of the present invention.

Referring now to FIG. 5, additional detail on the automated driving system 102 is shown. The automated driving system 102 includes a hardware processor 502 and memory 504. A sensor interface 506 provides communication with the vehicle sensors 104, for example by a wired or wireless communications medium and any appropriate communications protocol. The sensor interface 506 thereby collects sensor data and stores the sensor data in the memory 504. A vehicle control interface 508 issues commands to vehicle systems to affect, e.g., the acceleration, braking, and steering of the vehicle 100. The vehicle control interface 508 can communicate using the same medium and protocol as the sensor interface 506 or can use an independent communications medium and protocol.

An automated driving model 510 uses the stored sensor information to make determinations as to how to operate the vehicle 100 to avoid obstacles and to reach a destination. The automated driving model 510 may, in some embodiments, be trained using an on-board model training system 511 and model testing system 512. The on-board model training system 511 uses training data to generate an automated driving model 510 in accordance with testing results from the model testing system 512 and can use newly acquired sensor information and the outcomes of the decisions of the automated driving model 510 to update the automated driving model 510.

In some embodiments, the model training system 511 and the model testing system 512 can be implemented as software that is stored in memory 504 and that is executed by hardware processor 502. In other embodiments, these systems can be implemented as one or more discrete hardware components in the form of application-specific integrated chips or field programmable gate arrays.

Figure 6:
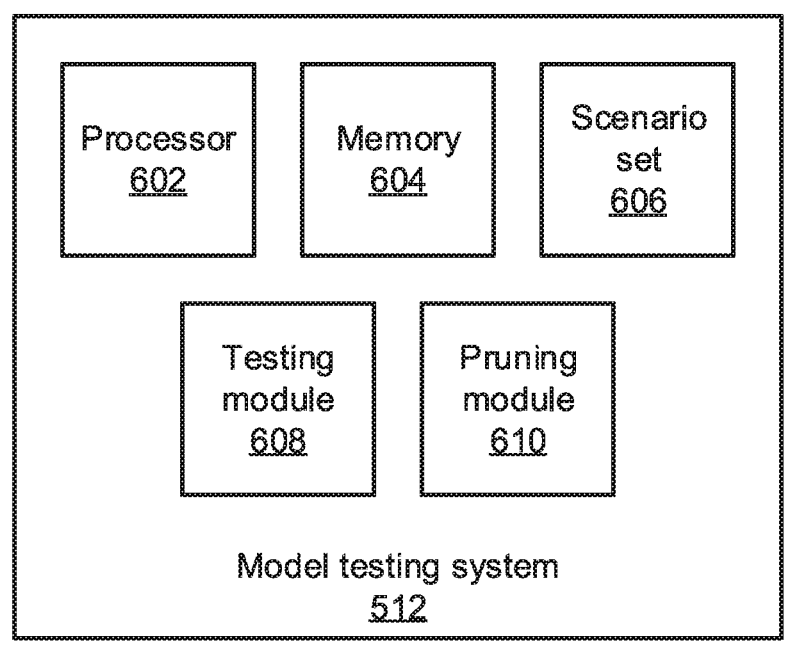
FIG. 6 is a block diagram of a model testing system that tests an automated driving model by pruning scenarios that have certain outcomes before adding additional obstacles to the scenarios in accordance with an embodiment of the present invention.

Referring now to FIG. 6, additional detail on the model testing system 512 is shown. It should be understood that the model testing system 512 can be implemented on-board, as shown above, or can instead be implemented at another location, with the resulting automated driving model 510 being subsequently deployed to the vehicle 100 by any appropriate means. FIG. 6 illustrates a model testing system 512 with its own hardware processor 602 and memory 604, but it should be understood that other embodiments may share a processor with the automated driving system 102 or, alternatively, may be part of a standalone training/testing system that shares a processor with a model training system 511.

The memory 604 stores a set of scenarios 606. This set of scenarios 606 starts as an initial set that describe a single obstacle on the road. The set of scenarios 606 is then iteratively pruned and updated to include additional obstacles. A testing module 608 tests each scenario in the set of scenarios 606 as described above, storing the outcomes of each test in the memory 604. A pruning module 610 then removes from the set of scenarios any scenarios that reached a "safe" or "collision" outcome. The pruning module 610 then adds additional scenarios, based on those scenarios that remain, that include an additional obstacle. The testing module 608 performs testing on the updated scenario set 606 and this process continues until a target number of obstacles is reached.

Figure 7:
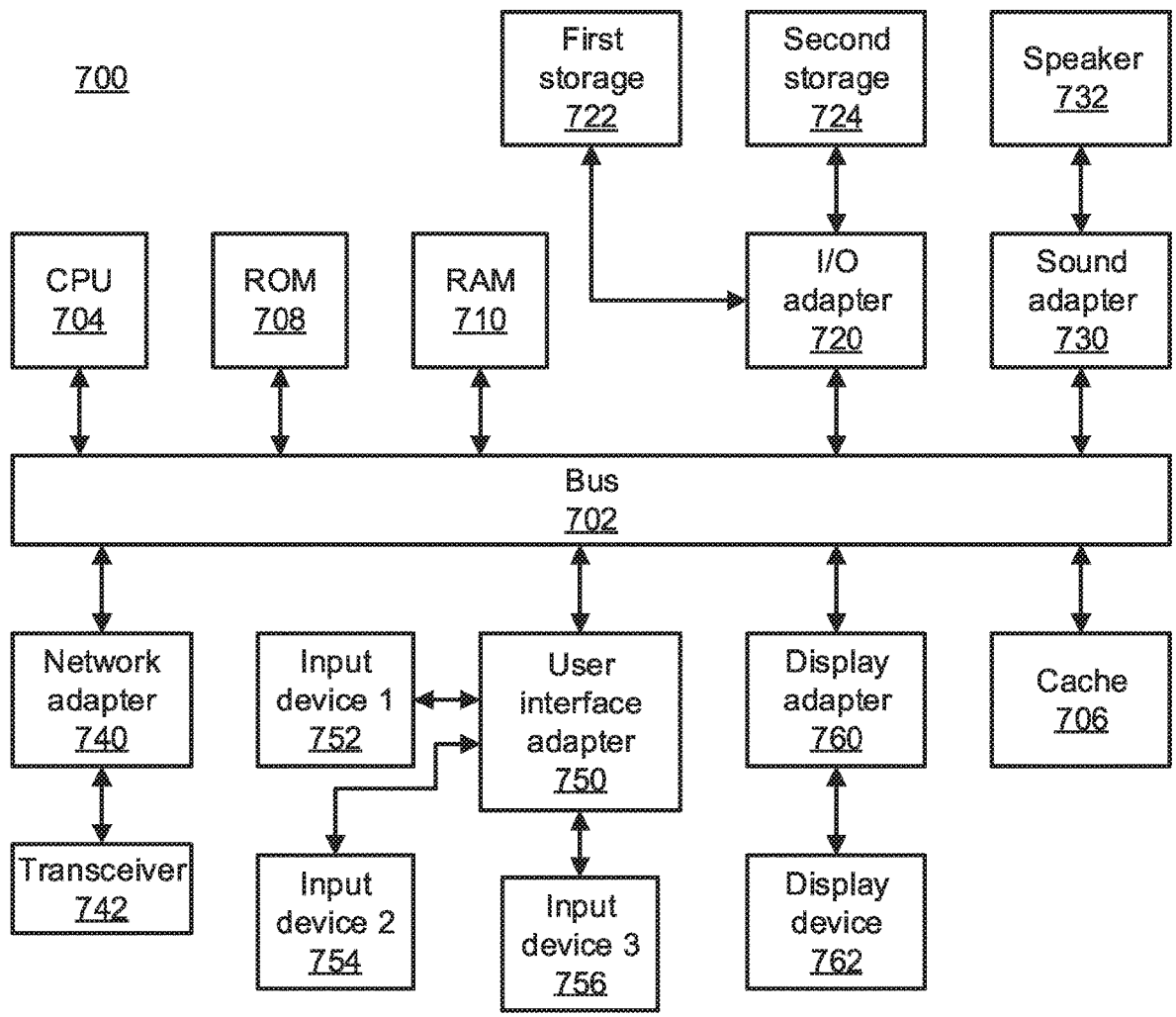
FIG. 7 is a block diagram of a processing system in accordance with an embodiment of the present invention.

Referring now to FIG. 7, an exemplary processing system 700 is shown which may represent the automated driving system 102 or the model testing system 512. The processing system 700 includes at least one processor (CPU) 704 operatively coupled to other components via a system bus 702. A cache 706, a Read Only Memory (ROM) 708, a Random Access Memory (RAM) 710, an input/output (I/O) adapter 720, a sound adapter 730, a network adapter 740, a user interface adapter 750, and a display adapter 760, are operatively coupled to the system bus 702.

A first storage device 722 and a second storage device 724 are operatively coupled to system bus 702 by the I/O adapter 720. The storage devices 722 and 724 can be any of a disk storage device (e.g., a magnetic or optical disk storage device), a solid state magnetic device, and so forth. The storage devices 722 and 724 can be the same type of storage device or different types of storage devices.

A speaker 732 is operatively coupled to system bus 702 by the sound adapter 730. A transceiver 742 is operatively coupled to system bus 702 by network adapter 740. A display device 762 is operatively coupled to system bus 702 by display adapter 760.

A first user input device 752, a second user input device 754, and a third user input device 756 are operatively coupled to system bus 702 by user interface adapter 750. The user input devices 752, 754, and 756 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 752, 754, and 756 can be the same type of user input device or different types of user input devices. The user input devices 752, 754, and 756 are used to input and output information to and from system 700.

Of course, the processing system 700 may also include other elements (not shown), as readily contemplated by one of skill in the art, as well as omit certain elements. For example, various other input devices and/or output devices can be included in processing system 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 700 are readily contemplated by one of ordinary skill in the art given the teachings of the present principles provided herein.

Having described preferred embodiments of training and testing automated driving models (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for deploying an automated driving model, comprising:
   testing an automated driving model with a set of scenarios that include a single obstacle;
   pruning the set of scenarios to include only those scenarios that do not result in a collision, but that may result in a collision with the addition of another obstacle;
   adding new scenarios to the set of scenarios to include scenarios that have an additional obstacle to form an updated set of scenarios;
   testing the automated driving model with the updated set of scenarios; and
   deploying the automated driving model to a vehicle to control operation of one or more systems in the vehicle.

2. The computer-implemented method of claim 1, further comprising repeating said steps of pruning, adding, and testing with the updated set of scenarios until a number of obstacles reaches a target number of obstacles.

3. The computer-implemented method of claim 1, wherein pruning the set of scenarios comprises removing any scenarios that had an outcome where the vehicle is always safe and any scenarios that had an outcome where the vehicle collides with an obstacle.

4. The computer-implemented method of claim 1, wherein each scenario has one or more attributes selected from the group consisting of the obstacle traveling out of the scenario boundaries, sensing the obstacle by the vehicle, the obstacle colliding with the vehicle, the obstacle moving into the vehicle's path, and the vehicle reaching a scenario goal position.

5. The computer-implemented method of claim 1, wherein testing the automated driving model comprises determining whether a vehicle that is operated by the automated driving model can reach a scenario goal position within a scenario timeframe and without colliding with an obstacle.

6. The computer-implemented method of claim 5, wherein testing the automated driving model comprises extrapolating obstacle positions based on obstacle starting positions and one or more obstacle parameters.

7. The computer-implemented method of claim 5, wherein testing the automated driving model comprises determining a vehicle's possible range of paths as determined by one or more vehicle characteristics.

8. The computer-implemented method of claim 5, wherein testing the automated driving model comprises limiting an ability of the vehicle to detect obstacles to only those objects that are within a sensing distance.

9. The computer-implemented method of claim 5, wherein determining the vehicle that is operated by the automated driving model can reach the scenario goal position comprises using the automated driving model and simulated sensor information to direct motions for the vehicle within a scenario boundary.

10. A non-transitory computer readable storage medium comprising a computer readable program for deploying an automated driving model, wherein the computer readable program when executed on a computer causes the computer to perform the steps of:
    testing an automated driving model with a set of scenarios that include a single obstacle;
    pruning the set of scenarios to include only those scenarios that do not result in a collision, but that may result in a collision with the addition of another obstacle;
    adding new scenarios to the set of scenarios to include scenarios that have an additional obstacle to form an updated set of scenarios;
    testing the automated driving model with the updated set of scenarios; and
    deploying the automated driving model to a vehicle to control operation of one or more systems in the vehicle.

11. The computer readable storage medium of claim 10, further comprising repeating said steps of pruning, adding, and testing with the updated set of scenarios until a number of obstacles reaches a target number of obstacles.

12. A system for deploying an automated driving model, comprising:
    a testing module configured to test an automated driving model with a set of scenarios that include a single obstacle;
    a pruning module configured to prune the set of scenarios to include only those scenarios that do not result in a collision, but that may result in a collision with the addition of another obstacle, and to add new scenarios to the set of scenarios to include scenarios that have an additional obstacle to form an updated set of scenarios, wherein the testing module is further configured to test the automated driving model with the updated set of scenarios; and
    a network adapter configured to deploy the automated driving model to a vehicle to control operation of one or more systems in the vehicle.

13. The system of claim 12, wherein the testing and pruning module are configured to repeat the pruning, adding, and testing of updated scenarios until a number of obstacles reaches a target number of obstacles.

14. The system of claim 12, wherein the pruning module is further configured to remove any scenarios that had an outcome where the vehicle is always safe and any scenarios that had an outcome where the vehicle collides with an obstacle.

15. The system of claim 12, wherein each scenario has one or more attributes selected from the group consisting of the obstacle traveling out of the scenario boundaries, sensing the obstacle by the vehicle, the obstacle colliding with the vehicle, the obstacle moving into the vehicle's path, and the vehicle reaching a scenario goal position.

16. The system of claim 12, wherein the testing module is further configured to determine whether a vehicle that is operated by the automated driving model can reach a scenario goal position within a scenario timeframe and without colliding with an obstacle.

17. The system of claim 16, wherein the testing module is further configured to extrapolate obstacle positions based on obstacle starting positions and one or more obstacle parameters.

18. The system of claim 16, wherein the testing module is further configured to determine a vehicle's possible range of paths as determined by one or more vehicle characteristics.

19. The system of claim 16, wherein the testing module is further configured to limit an ability of the vehicle to detect obstacles to only those objects that are within a sensing distance.

20. The system of claim 16, wherein the testing module is further configured to use the automated driving model and simulated sensor information to direct motions for the vehicle within a scenario boundary.

* * * * *